(12) United States Patent
Tseng et al.

(10) Patent No.: US 12,147,608 B2
(45) Date of Patent: Nov. 19, 2024

(54) COMPUTING SYSTEM WITH HEAD WEARABLE DISPLAY

(71) Applicant: HES IP HOLDINGS, LLC, Austin, TX (US)

(72) Inventors: Sheng-Lan Tseng, Taoyuan (TW); Yi-An Chen, Taichung (TW); Yung-Chin Hsiao, Taipei (TW)

(73) Assignee: HES IP HOLDINGS, LLC, Austin, TX (US)

(*) Notice: Subject to any disclaimer, the term of this patent is extended or adjusted under 35 U.S.C. 154(b) by 0 days.

(21) Appl. No.: 18/349,066

(22) Filed: Jul. 7, 2023

(65) Prior Publication Data

US 2024/0126376 A1 Apr. 18, 2024

Related U.S. Application Data

(60) Provisional application No. 63/389,698, filed on Jul. 15, 2022.

(51) Int. Cl.
| | |
|---|---|
| *G06F 3/01* | (2006.01) |
| *G06F 1/16* | (2006.01) |
| *G06F 3/0488* | (2022.01) |
| *G06F 3/16* | (2006.01) |

(52) U.S. Cl.
CPC .............. *G06F 3/017* (2013.01); *G06F 1/163* (2013.01); *G06F 3/013* (2013.01); *G06F 3/0488* (2013.01); *G06F 3/167* (2013.01)

(58) Field of Classification Search
CPC .......... G06F 3/017; G06F 1/163; G06F 3/013; G06F 3/0488; G06F 3/167
See application file for complete search history.

(56) References Cited

U.S. PATENT DOCUMENTS

| | | | |
|---|---|---|---|
| 11,280,997 B1* | 3/2022 | Gao | G02B 6/0076 |
| 2008/0117289 A1 | 5/2008 | Schowengerdt et al. | |
| 2012/0056989 A1* | 3/2012 | Izumi | G06F 3/04812 |
| | | | 348/46 |

(Continued)

FOREIGN PATENT DOCUMENTS

| | | |
|---|---|---|
| CN | 107438796 A | 12/2017 |
| CN | 108427498 A | 8/2018 |

(Continued)

*Primary Examiner* — Md Saiful A Siddiqui
(74) *Attorney, Agent, or Firm* — Chen Yoshimura LLP

(57) ABSTRACT

A computing system includes: a first input device for receiving a first input data from a user, the first input device includes a computing module for processing a data inputted from the first input device and generating an output data; and a head mounted display, telecommunicatively connected to the first input device by a communication module, for receiving the output data and displaying a binocular virtual image related to the output data; wherein the head mounted display has a first light direction adjuster and a second light direction adjuster for changing the direction of a first light signal and a second light signal emitted by a first emitter and a second emitter respectively, such that the first light signal and the second light signal are emitted relative to the first angle and the second angle of the user's frontal plane towards a first eye and a second eye respectively.

13 Claims, 9 Drawing Sheets

(56) References Cited

U.S. PATENT DOCUMENTS

| | | | |
|---|---|---|---|
| 2014/0368412 A1* | 12/2014 | Jacobsen | G06F 3/167 |
| | | | 345/8 |
| 2015/0169070 A1 | 6/2015 | Harp et al. | |
| 2016/0178908 A1 | 6/2016 | Dobschal et al. | |
| 2016/0238845 A1 | 8/2016 | Alexander et al. | |
| 2016/0284129 A1* | 9/2016 | Nishizawa | G06F 3/013 |
| 2017/0078651 A1 | 3/2017 | Russell | |
| 2017/0153672 A1* | 6/2017 | Shin | H04M 1/724097 |
| 2018/0081322 A1 | 3/2018 | Robbins et al. | |
| 2018/0182174 A1 | 6/2018 | Choi | |
| 2018/0246336 A1 | 8/2018 | Greenberg | |
| 2018/0252926 A1 | 9/2018 | Alexander et al. | |
| 2018/0275410 A1* | 9/2018 | Yeoh | G06F 3/011 |
| 2018/0284441 A1 | 10/2018 | Cobb | |
| 2018/0356591 A1 | 12/2018 | Karafin et al. | |
| 2019/0101977 A1* | 4/2019 | Armstrong-Muntner | |
| | | | G06F 3/011 |
| 2019/0121132 A1 | 4/2019 | Shamir et al. | |
| 2019/0129178 A1* | 5/2019 | Patterson | G02B 6/0076 |
| 2019/0172216 A1 | 6/2019 | Ninan et al. | |
| 2019/0187473 A1 | 6/2019 | Tomizawa et al. | |
| 2019/0285897 A1 | 9/2019 | Topliss et al. | |
| 2019/0293939 A1 | 9/2019 | Sluka | |
| 2019/0320165 A1 | 10/2019 | French et al. | |
| 2020/0033606 A1* | 1/2020 | Takeda | G02B 17/082 |
| 2022/0311992 A1 | 9/2022 | Lai et al. | |

FOREIGN PATENT DOCUMENTS

| | | |
|---|---|---|
| CN | 109073901 A | 12/2018 |
| CN | 109716244 A | 5/2019 |
| CN | 110168427 A | 8/2019 |
| JP | H08-166556 A | 6/1996 |
| JP | H09-105885 A | 4/1997 |
| JP | 2011-13688 A | 1/2011 |
| JP | 2016-180939 A | 10/2016 |
| JP | 2018-508036 A | 3/2018 |
| JP | 2018-132756 A | 8/2018 |
| JP | 2018-533062 A | 11/2018 |
| KR | 20120069133 A | 6/2012 |
| TW | 201716827 A | 5/2017 |
| TW | 201809214 A | 3/2018 |
| WO | 2016105281 A | 6/2016 |
| WO | 2021092314 A1 | 5/2021 |

\* cited by examiner

COMPUTING SYSTEM WITH HEAD WEARABLE DISPLAY

BACKGROUND OF THE DISCLOSURE

Technical Field

The present disclosure relates to a mobile computing system, more particularly relates to a mobile computing system combined with an augmented reality display system.

Description of the Related Art

Current computer systems such as desktop computers, laptops or tablet personal computers present information to users via a flat panel display, and traditional flat panel displays can only display two-dimensional information. In recent years, augmented reality or virtual reality has been developed by using head mounted displays to display images. Unlike traditional flat panel displays, the head mounted displays in augmented reality or virtual reality have the ability to present three-dimensional images. Therefore, the head mounted display combined with the computer system as a mobile computer application will be the future trend.

The biggest difference between augmented reality and virtual reality is that augmented reality combines the physical object in the environment and the virtual 3D binocular virtual image presented by the head mounted display to create a virtual and real mixed use environment, while the virtual reality user environment only contains virtual 3D binocular virtual images. Compared with virtual reality, augmented reality is more suitable to be combined with computer system to become a new-generation mobile computer system. Since the existing augmented reality display technology is not yet mature, augmented reality head mounted display technology is the research and development intersection to realize the combination of augmented reality with mobile computer system.

SUMMARY OF THE DISCLOSURE

Compared to the prior art, this disclosure is advantageous in overcoming focal rivalry and vergence-accommodation conflict (VAC) in virtual reality/mixed reality displays. In the field of augmented reality or mixed reality, the depth-of-field perception and three-dimensional (3D) effect of virtual images are usually achieved through parallax imaging techniques. The parallax image of the virtual image is displayed on a screen at a fixed distance from the user's left eye and right eye respectively; however, this distance usually differs from the depth-of-field perception of the viewpoint of the virtual image being presented. In addition, when a virtual image is superimposed on an object to produce augmented reality or mixed reality, since the depth of the object and screen is different from the distance of the user's eyes, the virtual image replaced by the screen and object cannot be intersectioned by the user's eyes at the same time. Finally, this disclosure can provide the feeling of an accurate depth to individual users, which facilitates the superposition of real and virtual objects.

In addition, the computing system of this disclosure replaces a conventional display device with a head mounted display, which enhances the convenience of use. Besides the significant increase in the range of displays, a user also can use this disclosure at any time and any place.

DESCRIPTION OF THE PREFERRED EMBODIMENTS

Figure 1:
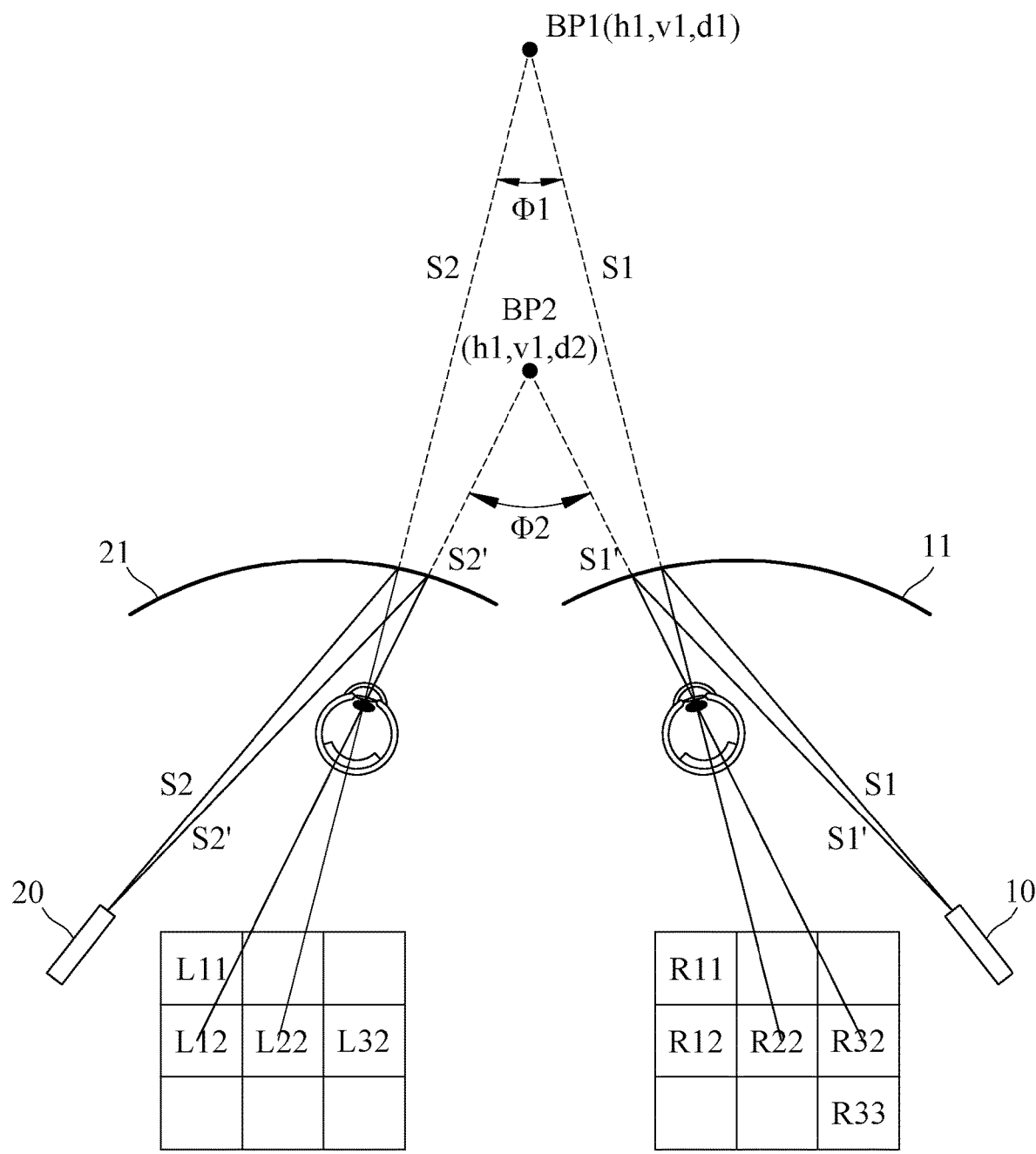
FIG. 1 is a schematic view showing a bi-ocular virtual image imaging method with depth in accordance with this disclosure.

The terms used hereinafter are intended to be construed in their broadest reasonable manner, even when such terms are used in conjunction with techniques described in detail for particular embodiments. The following description may even emphasize certain terms; however, any terms that are construed in a restricted manner are specifically defined and described in this embodiment.

This disclosure presents a three-dimensional (3D) binocular virtual image imaging method with a depth as follows. The term "fixate" as described in this disclosure refers to the binocular vision in which the visual axes of a user's eyes are attempted to point to the location of an object viewed and intersection at the object, so that the user can perceive the image of the object. In this specification, the visual axis generally refers to the line connecting a fixation point to the central fovea of macula through the pupil. In general, when a user fixates at an object, the crystalline lens and ciliary muscle will attempt adjusting the intersection, so that the user can perceive the image of the object relatively clearly. According to the imaging method of this disclosure, when the user's eyes fixate at a part of the 3D binocular virtual image presented in this disclosure, the location of intersection of the visual axes of the two eyes and the intersection of the light paths of light signals (such as a left light signal and a right light signal) that form the part are substantially the same. In this way, the depth of the 3D binocular virtual image perceived by the user (or the part of the 3D binocular virtual image that the user fixates at) is the same as the coordinates of the depth of the location that the user fixates at (and the horizontal and vertical coordinates are also the same), thus avoiding vergence-accommodation conflict (VAC) and focal rivalry. The horizontal and vertical coordinates of the two are the same, thus avoiding vergence-accommodation conflict (VAC) and focal rivalry. In addition, since the coordinate location of the perceived 3D binocular virtual image (or the part of the 3D binocular virtual image that the user fixates at) in the physical 3D space is the same as the location of the user's binocular fixation. When the user touches the location with a part of the hand (such as the index fingertip or the thumb and the index finger at the same time), the user can fixate at the part of the hand and the 3D binocular virtual image at the same time, and can also see the part of the hand and the 3D binocular virtual image at the same time, thus making the interaction between virtual and real objects more realistic without the need to use other auxiliary media.

The principle of presenting a binocular virtual image and enabling the user to see the virtual image at specific 3D coordinates in the 3D physical space in accordance with this embodiment of the disclosure will be described below. In this disclosure, the term "light convergence angle" refers to the angle between a first incident light signal and a second incident light signal 92 (such as a left light signal and a right light signal), and the term "convergence angle" refers to the angle between the visual axes of a user's eyes.

With reference to FIG. 1 for the schematic view showing an imaging method of a binocular virtual image with depth in accordance with this disclosure, a first binocular pixel BP1 as shown in the figure is generated by brain image fusion after a user's first eye (such as the right eye) perceives a first light signal S1 (such as a right light signal) and the user's second eye (such as the left eye) perceives a second light signal S2 (such as a left light signal). In some embodiments, in order to reduce the volume of the head mounted display, the first light signal S1 and second light signal S2 can be reflected to the user's eyes by optical components with a reflective capability to minimize the problem of increasing the volume of the head mounted display due to the long light path; but in other embodiments, the first light signal S1 and the second light signal S2 can enter the user's eyes directly after the alignment or the direction is adjusted. A first optical convergence angle φ1 is defined between the light paths of the first light signal S1 and the second light signal S2, and the point of intersection of the light paths of the first light signal S1 and the second light signal S2 is situated at a location of the spatial coordinates (h1,v1,d1). The reference point (of the spatial coordinates (h1,v1,d1) (or the coordinates of the origin) can be set at will, for example, the reference point can be set at a location of the head mounted display, or any specific location in the using space, etc. According to natural human vision, when a user watches the first binocular pixel BP1, the user's eyeballs naturally rotate towards the location of the spatial coordinates (h1,v1,d1). Under normal circumstances, the visual axes of both eyes will also naturally point to the location of the spatial coordinates (h1,v1,d1); theoretically, the point of intersection of the visual axes of both eyes will be at the spatial coordinates (h1,v1,d1). However, because the geometry of the eyes is not perfect, or due to other physiological factors, the point of intersection of the visual axes of both eyes will also be roughly situated at the spatial coordinates (h1,v1,d1), which does not conflict with this binocular imaging method. One of the methods of perceiving the depth when human visually distinguishes the coordinates of the depth of a real object is based on a binocular visual axis convergence angle (which is the angle between the visual axes of both eyes). When the relative binocular visual axis convergence angle is larger when viewing an object with both eyes, the object perceived is closer to the user; conversely, when the relative binocular visual axis convergence angle is smaller when viewing an object with both eyes, the object perceived is farther away from the user. In FIG. 1, the second binocular pixel BP2 is generated by brain image fusion after the user's first eye (such as the right eye) perceives a first light signal S1' (such as a right light signal) and the user's second eye (such as the left eye) perceives a second light signal S2' (such as a left light signal). A second optical convergence angle φ2 is defined between the light paths of the first light signal S1' and second light signal S2', and the point of intersection of the light paths of the first light signal S1' and the second light signal S2' is situated at a location of the spatial coordinates (h1,v1,d2). Since when the user views the second binocular pixel BP2, the relative binocular visual axis convergence angle of the two eyes is greater than that when viewing the first binocular pixel BP1, the user perceives that the second binocular pixel BP2 is closer to the user than the first binocular pixel BP1 (or it has a smaller depth).

It is noteworthy that unlike all traditional VR or AR head mounted displays, the users do not fixate at the screen, nor fixates at a plurality of locations with a preset fixed depth during the use of the three-dimensional (3D) binocular virtual image imaging method that presents the depth in accordance with this disclosure. Further, in this disclosure, the users do not fixate at the optical components with reflective capability that reflect the first light signal S1 and the second light signal S2. This disclosure allows the users to fixate at a certain location of the actual space, and uses the light direction adjuster and light emitter to adjust and project the light path that conforms to the depth of perception in natural vision to an appropriate location on the retina, so as to create the perception of the depth of the 3D binocular virtual image. According to one of the embodiments of this disclosure, the head mounted display can project a panoramic view of each frame at a given field of view at the same time, then the user's retina will receive the information of all 3D binocular virtual images in the current space simultaneously, and the users can arbitrarily adjust the viewing direction to fixate at the 3D binocular virtual images in different locations.

Figure 2:
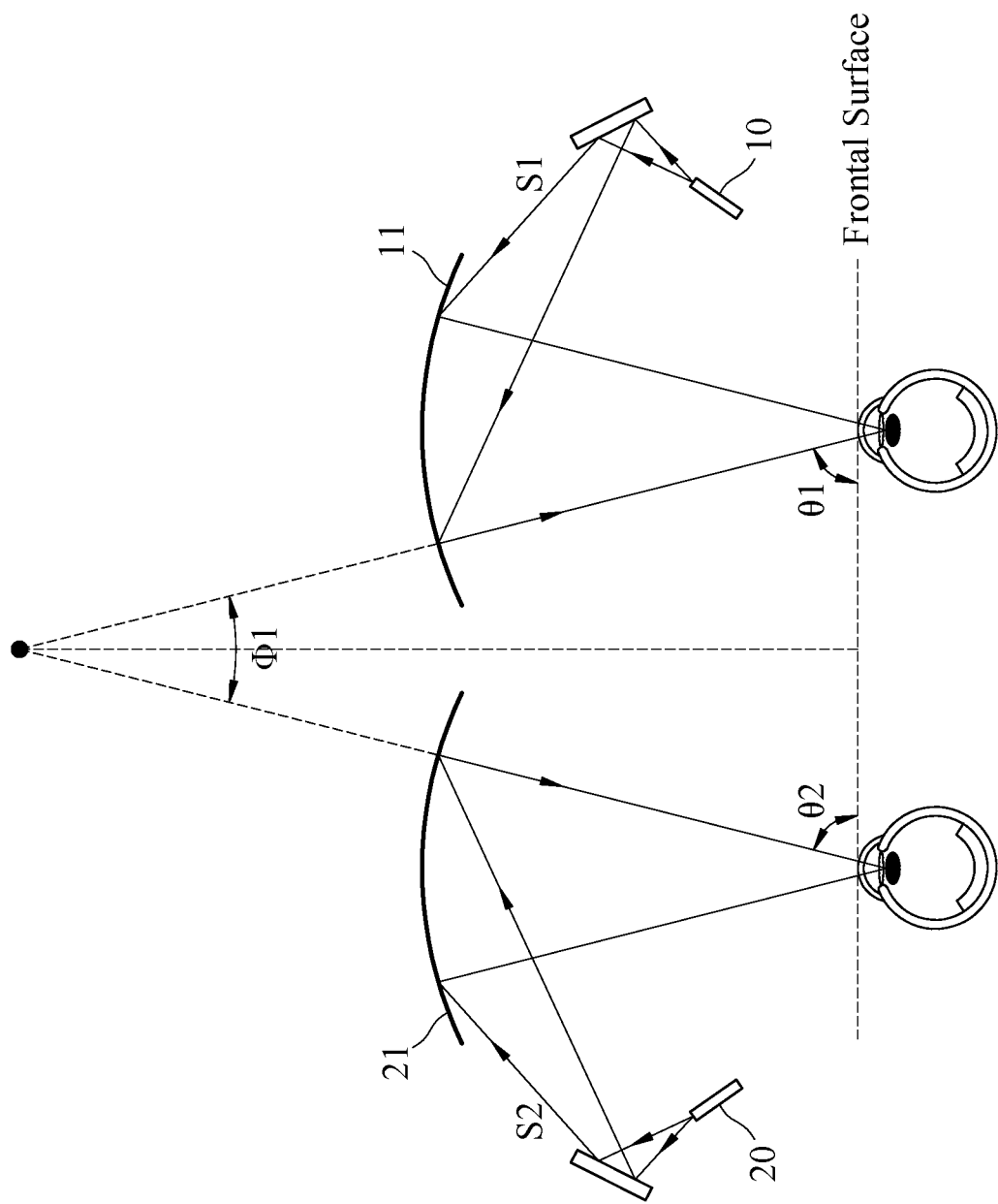
FIG. 2 is a schematic view showing another bi-ocular virtual image imaging method with depth in accordance with this disclosure.

The method for presenting a 3D binocular virtual image with a depth in accordance with an embodiment of this disclosure will be illustrated by means of an actual device. In FIG. 2, the head mounted display 90 of this disclosure has a first emitter 10 and a second emitter 20. In addition, the head mounted display has a first light direction adjuster 11 and a second light direction adjuster 21 for changing the direction of a first light signal S1 and a second light signal S2 emitted by the first emitter 10 and the second emitter 20 respectively. For example, the first and second emitters 10, 20 can be laser beam scanning projectors (LBS projectors), which include light sources such as red laser, green laser and blue laser, light color regulators (such as bi-directional color light direction adjuster and polarized light direction adjuster), and two-dimensional (2D) adjustable reflectors (such as 2D microelectromechanical system "MEMS" mirrors). The 2D adjustable reflectors can be substituted by two one-dimensional (1D) reflectors (such as two 1D MEMS mirrors). The LBS projector sequentially generates and scans the light signal to form a 2D image with a predetermined resolution, for example, each frame has 1280×720 pixels. Therefore, a light signal with one pixel is generated at a time, and one pixel is projected towards the first light direction adjuster 11 and the second light direction adjuster 21 at a time. In order to let the user see the image with one eye, the LBS projector must sequentially generate the light signal of each pixel within the duration of visual persistence (such as 1/18 second), such as a 1280×720 light signal. Therefore, the visual persistence time of each light signal is approximately 60.28 nanoseconds. In another embodiment, the first and second emitters 10, 20 are digital light processing projectors (DLP projectors) capable of generating a color image at a time. Texas Instrument's DLP technology is one of the technologies capable of producing DLP projectors. The whole 2D color image frame, such as the one having 1280×720 pixels, can be projected at the same time.

The first light direction adjuster 11 and the second light direction adjuster 21 receive and redirect the plurality of light signals generated by the first emitter 10 and the second emitter 20. In an embodiment, the first light direction adjuster 11 and the second light direction adjuster 21 reflect the plurality of light signals and set the redirected light signal and the incident light signal on the same side of the first light direction adjuster 11 and the second light direction adjuster 21. In another embodiment, the first light direction adjuster 11 and the second light direction adjuster 21 (such as liquid crystal modulators) refract the plurality of light signals and set the redirected light signal and the incident light signal on different sides of the first light direction adjuster 11 and the second light direction adjuster 21. When the first light direction adjuster 11 and the second light direction adjuster 21 have the function of a refractor, the reflectance ratio can vary considerably, such as 20%-80%, depending on the capacity of the emitters. People having ordinary skill in the art can determine the reflectance ratio based on the characteristics of the emitters and the light direction adjusters. In an embodiment, the first light direction adjuster 11 and the second light direction adjuster 21 can be in the form of an eyeglass lens, and the relative light signals incident on the opposite sides of the first light direction adjuster 11 and the second light direction adjuster 21 can be transparent relative to the ambient light. In different embodiments, the degree of transparency can vary considerably. In an AR/MR application, the transparency is preferably 50%, and more preferably 75% in other embodiments. In addition, in order to redirect the light signal, the first light direction adjuster 11 and the second light direction adjuster 21 can merge a plurality of light signals to form a light direction adjuster image and let it pass the user's pupil and arrive the user's retina. The advantage of using the reflective light direction adjuster is that it does not use a light guide plate to direct the light signal to the user's eyes as in the prior art, and thus can solve the poor diffraction effects, including complex shadows, color distortion, etc. The first light direction adjuster 11 and the second light direction adjuster 21 can be holographic light direction adjusters, but such arrangement is not a preferred embodiment, since the diffraction effect can cause complex shadows and RGB distortions. In some embodiments, it is necessary to avoid using the holographic light direction adjuster.

In an embodiment, the first light direction adjuster 11 and the second light direction adjuster 21 have an ellipsoidal surface. In addition, the first emitter 10 is situated at an intersection of the first light direction adjuster 11, and the user's right eye is situated at another intersection of the ellipsoid. Similarly, the second light direction adjuster 21 has an ellipsoidal surface, and the second emitter 20 is situated at the intersection on the left side, and the user's left eye is situated at the intersection on the right side of the ellipsoid. According to the geometric characteristics of the ellipsoid, all light beams projected on the ellipsoidal surface will be reflected to the other intersection. In this case, all light beams projected from the emitters onto the ellipsoidal surface of the light direction adjuster will be reflected to the user's eyes. Therefore, the field of view (FOV) can be maximized to a level comparable to the ellipsoidal surface in this embodiment. In another embodiment, the first light direction adjuster 11 and the second light direction adjuster 21 can have flat surfaces and hologramic films which are configured to reflect light in an ellipsoid fashion.

The head mounted display further includes a control unit, which includes all necessary circuits to control the first emitter 10 and the second emitter 20. The control unit provides electronic signals to the emitters to generate a plurality of light signals. In an embodiment, the location and angle of the first emitter 10 and the second emitter 20 can be used to adjust the angle of incidence of the first light signal S1 (such as the right light signal) and the second light signal S2 (such as the left light signal) and the locations of the first light direction adjuster 11 (such as the right light direction adjuster) and the second light direction adjuster 21 for receiving the light signal. In this way (see FIG. 2), the first angle θ1 (relative to the user's frontal plane) of the first light signal S1 and the second angle θ2 (relative to the user's frontal plane) of the second light signal S2 projected to the user's right eye from the first light direction adjuster 11 and the second light direction adjuster 21 can be adjusted according to the location depth location of the desired 3D binocular virtual image. In some embodiments, the optical convergence angle φ (such as the optical convergence angle φ=180-θ1-θ2) formed by the first angle θ1 and the second angle θ2 can be used to change the depth of the binocular virtual image perceived by the user continuously. Such adjustment can be achieved by the control unit. The control unit can communicate with an independent image signal provider via a cable or wireless mechanism. The wireless communication includes 4G and 5G telecommunications, WiFi, Bluetooth, near field communication (near field communication), and network. The control unit includes a processor, a memory, an input/output interface (I/O interface) provided for the image signal provider to communicate with the user.

Figure 3:
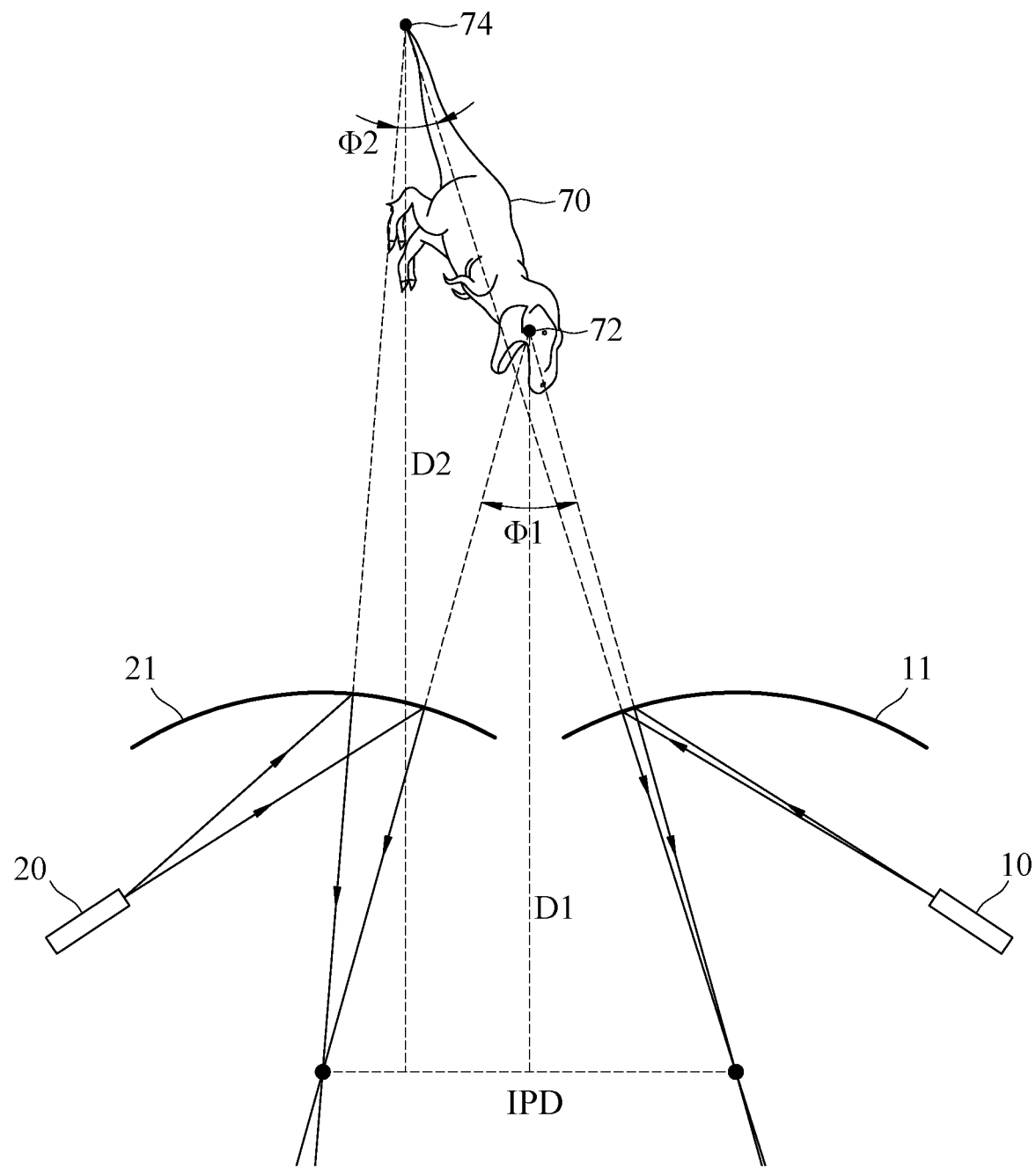
FIG. 3 is a schematic view showing another bi-ocular virtual image imaging method with depth in accordance with this disclosure.

In some embodiments as shown in FIG. 3, when the 3D binocular virtual image is formed by a plurality of pixels, the first light direction adjuster 11 receives and redirects the plurality of first (such as right) light signals to the user's a retina and display the plurality of right pixels of the 3D binocular virtual image. Meanwhile, the second light direction adjuster 21 receives and redirects the plurality of second (such as left) light signals to the user's another retina and display the plurality of left pixels of an object. The light path of each first light signal and its corresponding second light signal have unique optical convergence angle, therefore the binocular virtual pixels so formed have different depths of field. In this way, a single 3D binocular virtual image can have different depths of field at different locations. For example, when the single 3D binocular virtual image is a sphere, different optical convergence angles can be used to present the different depths of field at different parts of the sphere, so that the user gazing at each part of the sphere can perceive a different depth, thus generating a real 3D feeling, which is different from the traditional parallax 3D imaging method.

According to an embodiment of this disclosure, the relationship between the depth perceived and the convergence angle of the two eyes can be roughly expressed by:

$$\tan\frac{\beta}{2} = \frac{IPD}{2D}$$

where, β is the convergence angle of two eyes, D is the depth perceived, and IPD is the interpupillary distance, which is the distance between the right pupil and the left pupil. For example, in FIG. 3, the 3D binocular virtual image 70 is included in the first virtual binocular pixel 72 displayed by the first depth D1 and the second virtual binocular pixel 74 displayed by the second depth D2. The first depth D1 is related to the angle φ1. Particularly, the first depth D1 of the first virtual binocular pixel of the 3D binocular virtual image can be determined by the angle φ1 between the right light signal and the corresponding left light signal. Similarly, the second depth D2 is related to the angle φ2. Particularly, the second depth D2 of the second virtual binocular pixel of the 3D binocular virtual image can be determined by the angle φ2 between the right light signal and the corresponding left light signal. The user perceives that the second virtual binocular pixel 74 is farther away from the user than the first virtual binocular pixel 72 (i.e., the second virtual binocular pixel 74 has a larger depth), and the angle φ2 is smaller than the angle φ1).

According to the aforementioned method, this disclosure can display a 3D binocular virtual image with a continuously variable depth. In addition, this disclosure is characterized in that the location of the virtual pixel or the binocular virtual image in the physical space can be determined by utilizing the intersection of the light path extension of the first light signal S1 and the second light signal S2 in the physical space. On the other hand, the light path is extended toward the location of the user's retina, so that when the user sees the binocular virtual pixel or the binocular virtual image, the visual axes of the two eyes will also naturally and easily match with the light paths of the first optical signal S1 and the second optical signal S2. In this way, the 3D coordinates (including the depth) of the binocular virtual pixel or binocular virtual image in the physical space perceived by the user is consistent with the 3D coordinates (including the depth) of the intersection of the light path extension of the first light signal S1 and the second light signal S2. Therefore, there is no problem of focal rivalry and vergence-accommodation conflict. When the binocular virtual image is superimposed with the real object in the physical space, since the 3D coordinates (including the depth) of the light source in the physical object is consistent with the 3D coordinates (including the depth) of the intersection of the light paths extension of the first light signal S1 and the second light signal S2, so that the user can clearly see the physical object and the binocular virtual image. In addition, when the user reaches out and interacts with the binocular virtual image by a hand, the user's hand can easily touch the binocular virtual image at a location in the physical space, because the location at where the eyes fixate is the same as the location and depth of the binocular virtual image. Therefore, there will be no situation where the user cannot touch the binocular virtual image due to different locations and depths of field perceived. Since the location and the depth of the binocular virtual image can be determined from the intersection of the light paths extension of the first light signal S1 and the second light signal S2 in the physical space, therefore the binocular virtual image can be directly converted to the coordinates in the physical space, and the binocular virtual image in the physical space can be easily compared with the coordinates of the real object, and the interaction between the virtual object and the real object can be more accurate.

In order to accurately describe the location of a virtual binocular pixel in the space, each location in space is represented by three-dimensional (3D) coordinates, such as the XYZ coordinates. In other embodiments, a different 3D coordinates system can be used. Therefore, each virtual binocular pixel has 3D coordinates in a horizontal direction, a vertical direction, and a depth direction. The horizontal direction (or X-axis direction) is the direction along the interpupillary line. The vertical direction (or Y-axis direction) is the direction along the facial mid line and perpendicular to the horizontal direction. The depth direction (or Z-axis direction) is orthogonal to the frontal plane, and orthogonal to the horizontal and vertical directions.

Figure 4:
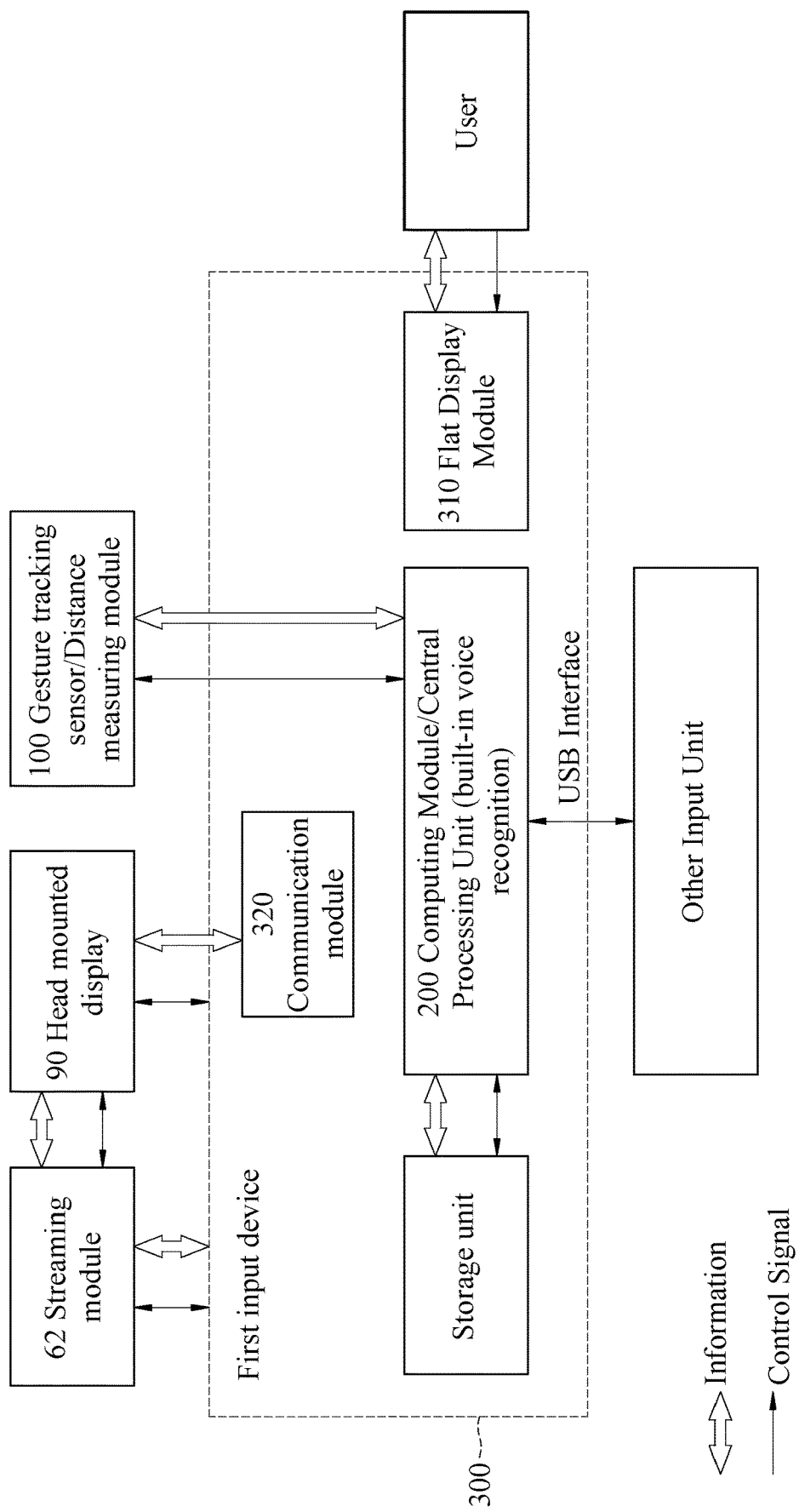
FIG. 4 is block diagram of a computing system with a head mounted display in accordance with this disclosure.

Based on the 3D imaging method of the head-mounted display 90 described above, it is possible to combine the head-mounted display 90 with a personal computer to form a state-of-the-art computing system by utilizing an augmented reality or virtual reality usage environment. In this way, the space of the user's environment can be utilized as a display space for the computing system. The computing system with the head mounted display 90 in accordance with this disclosure mainly includes a first input device 300 and a head mounted display 90. With reference to FIG. 4 for the block diagram of this disclosure, the first input device 300 receives a first input data from the user. The first input device 300 has the function of a traditional personal computer or laptop keyboard, or the function of a traditional mouse. In an embodiment, the first input device 300 is equipped with a traditional mechanical keyboard; or in another embodiment, the first input device 300 further includes a flat display module 310 that can display, for example, a user interface with a keyboard mode, and the flat display module 310 is a touch screen that provides a user interface for receiving the first input data from the user. The first input device 300 can also receive other non-keyboard input data, such as a direction data, sound control data or power On/Off data, etc. from the user.

Figure 5:
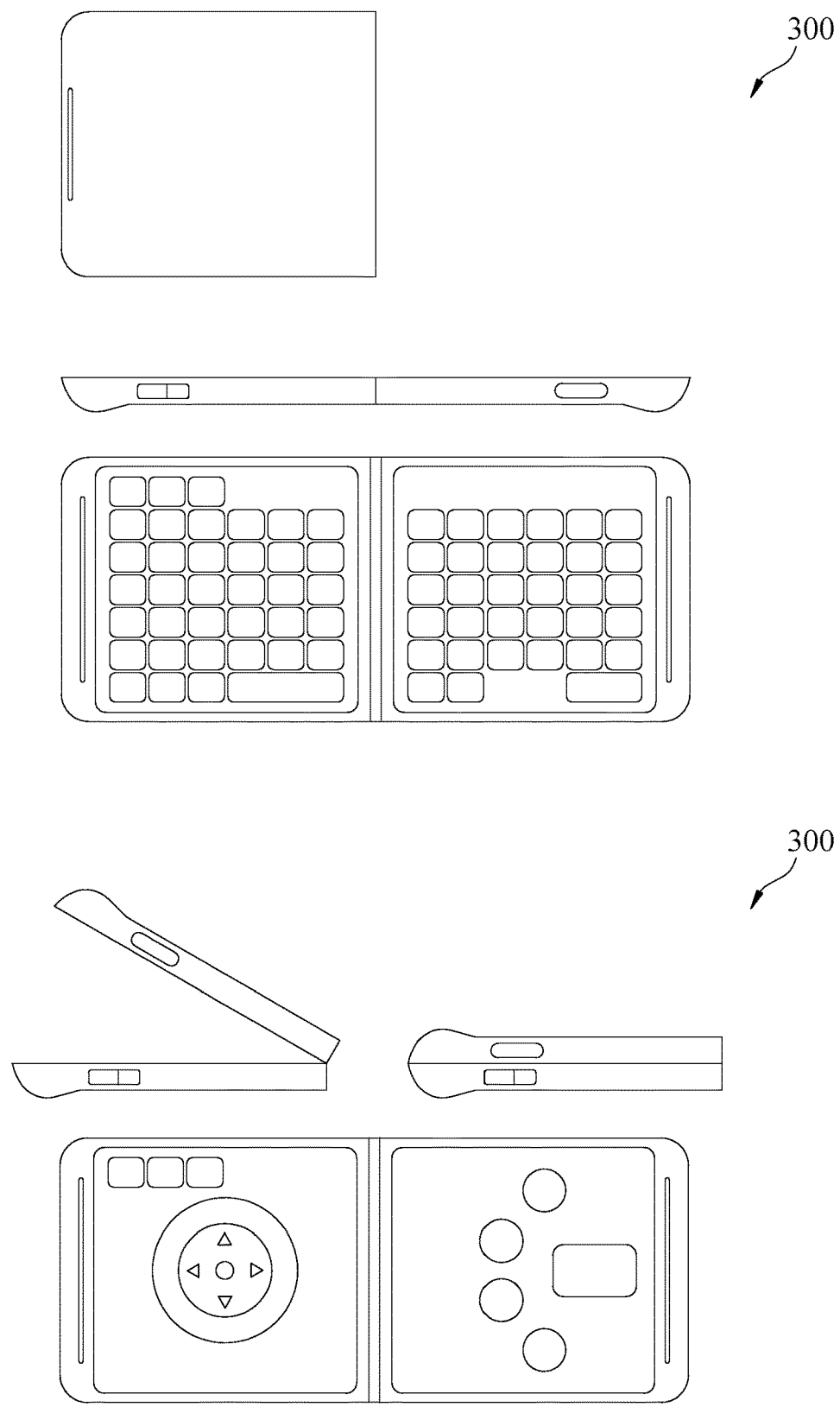
FIG. 5 is a schematic view of a first input device of a computing system with a head mounted display in accordance with this disclosure.

The first input device 300 further includes a computing module 200 for processing the input data inputted from the first input device 300 by the user and generating an output data. Specifically, the computing module 200 provides a computing function to the computing system of this disclosure. Therefore, the computing module 200 can be a computing processor such as a traditional central processing unit or graphic processor, etc. The first input device 300 is telecommunicatively connected to the head mounted display 90 through a communication module 320. The communication module 320 can be individually installed into the first input device 300 and the head mounted display 90. The communication module 320 can be any cable or wireless (such as WIFI, Bluetooth, RFID, etc.) communication mechanism. The head mounted display 90 receives the output data and displays a binocular virtual image related to the output data through the communication module 320. For example, when the user uses the first input device 300 with a mouse function to open an application program, the computing module 200 will drive the application program to start a corresponding window of the application program. The head mounted display 90 will then display an image of the corresponding window of the application program for the user; or the user can input a character string from the first input device 300 with a keyboard function, and the head mounted display 90 will display the image of the corresponding character string for the user. To make the first input device 300 portable, the first input device 300 can be foldable as shown in FIG. 5.

Figure 6:
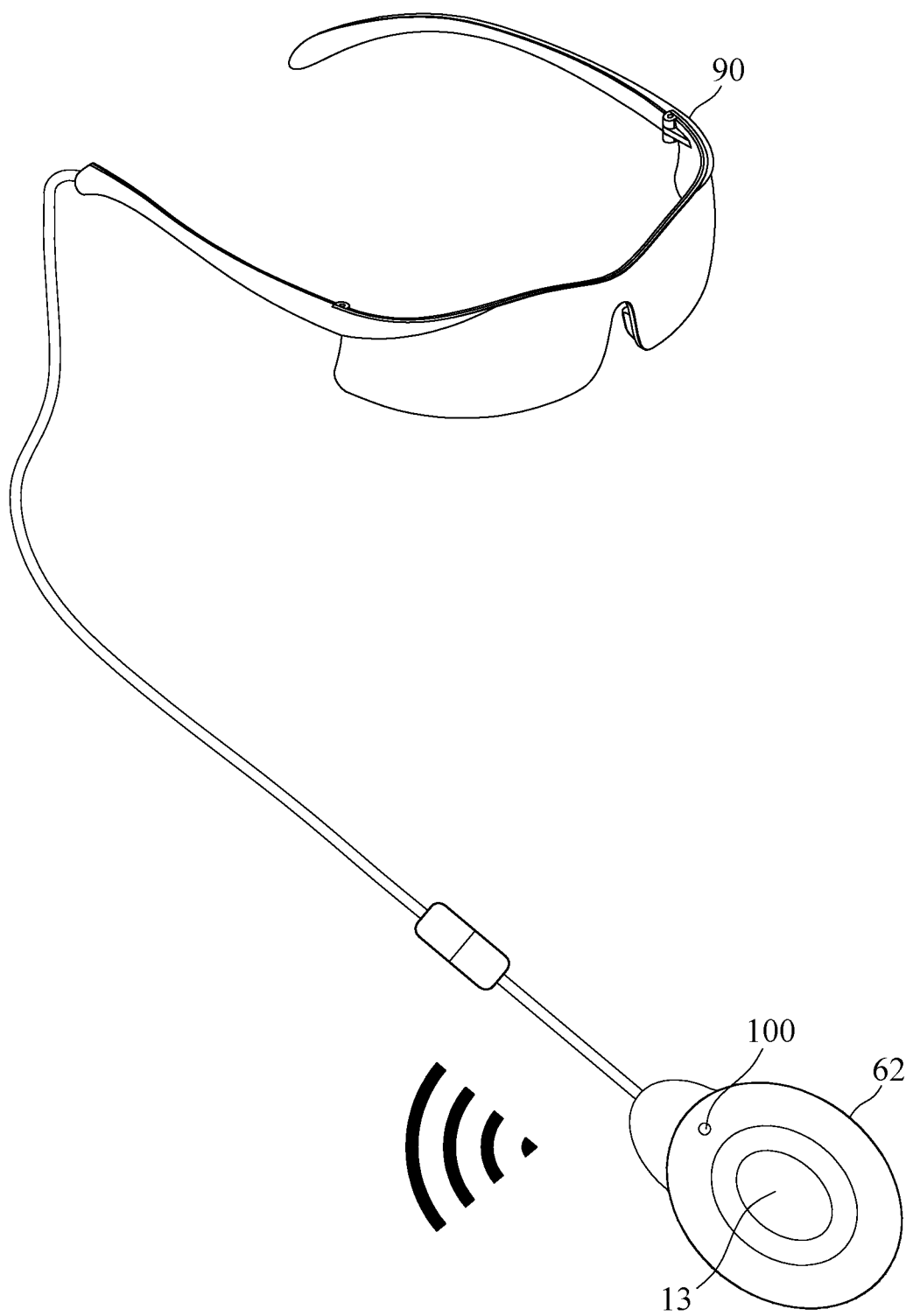
FIG. 6 is a schematic view of a streaming module of a computing system with a head mounted display in accordance with this disclosure.

In an embodiment as shown in FIG. 6, this disclosure further includes a streaming module 62. For example, the user may wear the streaming module 62 around the neck, on the wrist, on the fingers, or in a pocket. In some embodiments, the streaming module 62 may be another mobile device such as a mobile phone or a tablet PC. In other embodiments, the streaming module 62 may be a standalone device provided for a user to carry. The streaming module 62 is telecommunicatively connected to the head-mounted display 90 to deliver a stream of information to the head-mounted display 90 and cause the head-mounted display 90 to display the stream of information. The stream of information can be streaming audio/video information. In addition, the streaming module 62 includes a second input device 63 for providing an operating interface for the user to operate the streaming module 62 and receive the user's second input data (a data related to the operation of the streaming module 62). In some embodiments, when the streaming module 62 is a device worn around the user's neck, it can further include a gesture tracking sensor 100 for receiving a third input data from the user, and the third input data includes the coordinates of a part of the user's hand, or the form of the user's gesture. The third input data is mainly used to drive the virtual reality interaction between the user's hand and the binocular virtual image of the head mounted display 90 projected in the physical space. In other words, the computing module 200 receives the third input data and determines the part of coordinates of the user's hand or the form of the user's gesture, and executes a corresponding instruction. In other embodiments, the streaming module 62 includes a biometric sensor (not shown in the figure) for sensing the user's biological parameters such as heartbeat or respiration rate, etc. The streaming module 62 may also include a touch screen for receiving the third input data.

Figure 7:
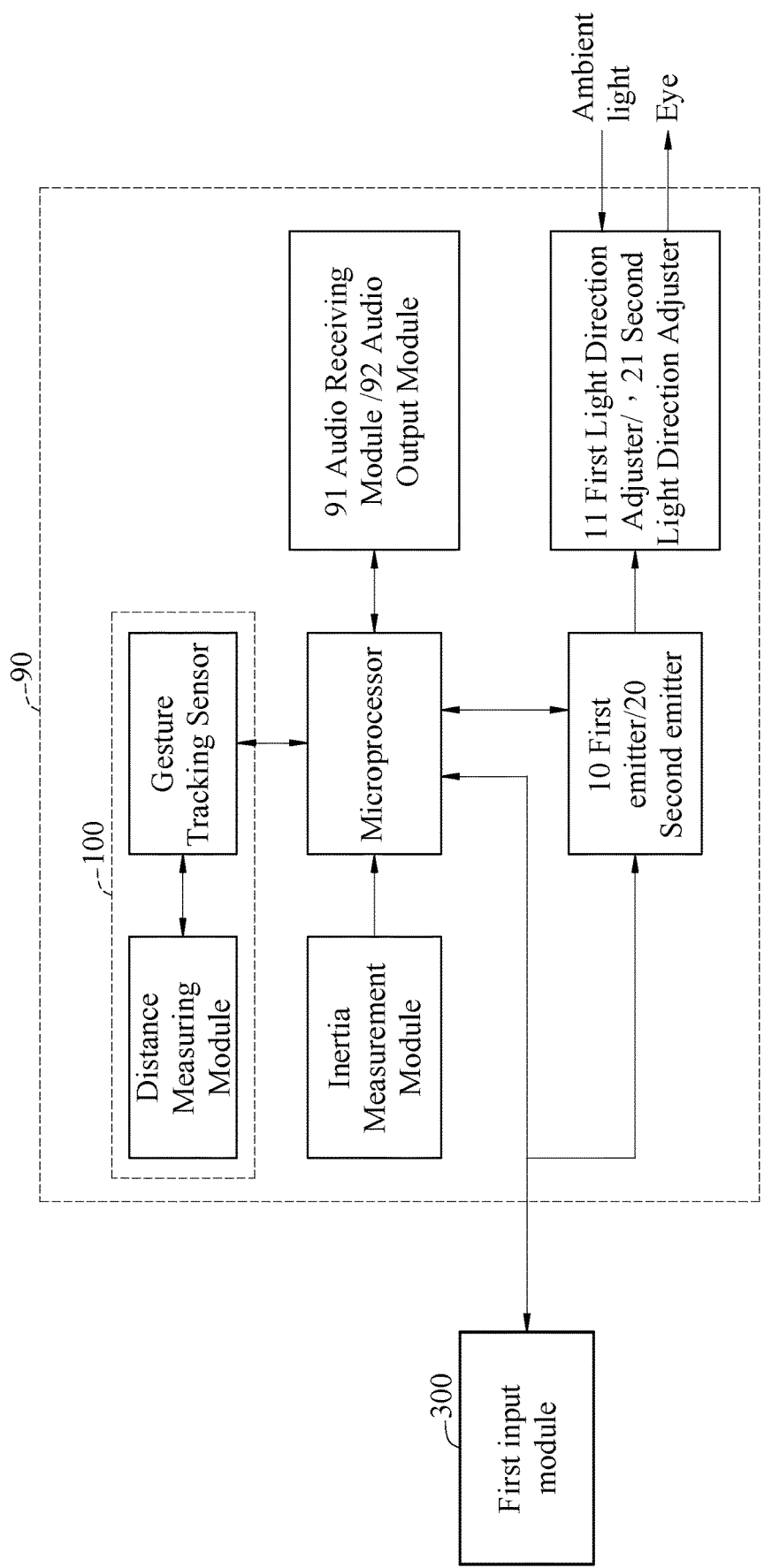
FIG. 7 is a block diagram of a head mounted display in accordance with this disclosure.

With reference to FIG. 7 for the block diagram of a head mounted display 90 in accordance with an embodiment of this disclosure, the head mounted display 90 further includes an audio output module 92 for outputting an audio related to the output data. For example, the audio output module 92 can be a speaker installed to the head mounted display 90. The output data can include an image data and a sound data, and the head mounted display 90 can display the image data, and the speaker can output the sound data. In another embodiment of this disclosure, the user can ask the computing system to execute an instruction through voice control. Accordingly, the head-mounted display 90 may also include an audio receiving module 91, such as a microphone, for receiving a fourth input data from the user, which may be the user's voice received by the audio receiving module 91, and then recognized by the computing module 200 for the voice recognition and the execution of the corresponding instruction. In some embodiments, the head mounted display 90 can be installed with a gesture tracking sensor/distance measuring module 100. The computing system of this disclosure determines the spatial coordinates of a part of the user's hand by the gesture tracking sensor/distance measuring module 100, so as to allow comparison of the spatial coordinate location of the part of the hand in relation to the currently displayed binocular virtual image (or virtual object), which is used to realize the basis for interaction between the hand and the binocular virtual image (or virtual object). In some embodiments, the head-mounted display 90 may also include an inertia measurement module to determine the spatial orientation of the user's head.

Figure 8A:
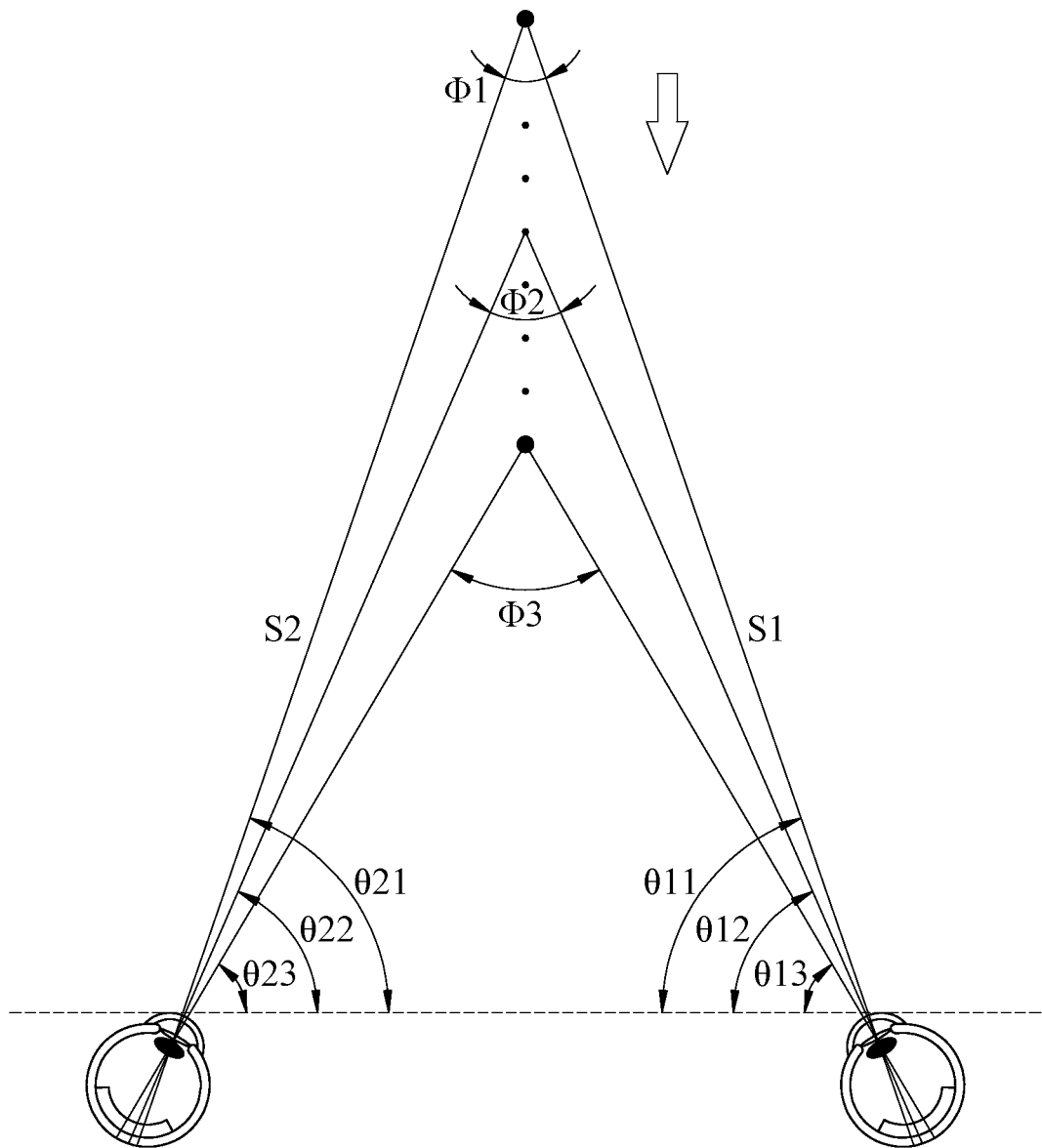
FIG. 8A is a schematic diagram showing a method of displaying a continuously variable depth of binocular virtual images in accordance with this disclosure.
Figure 8B:
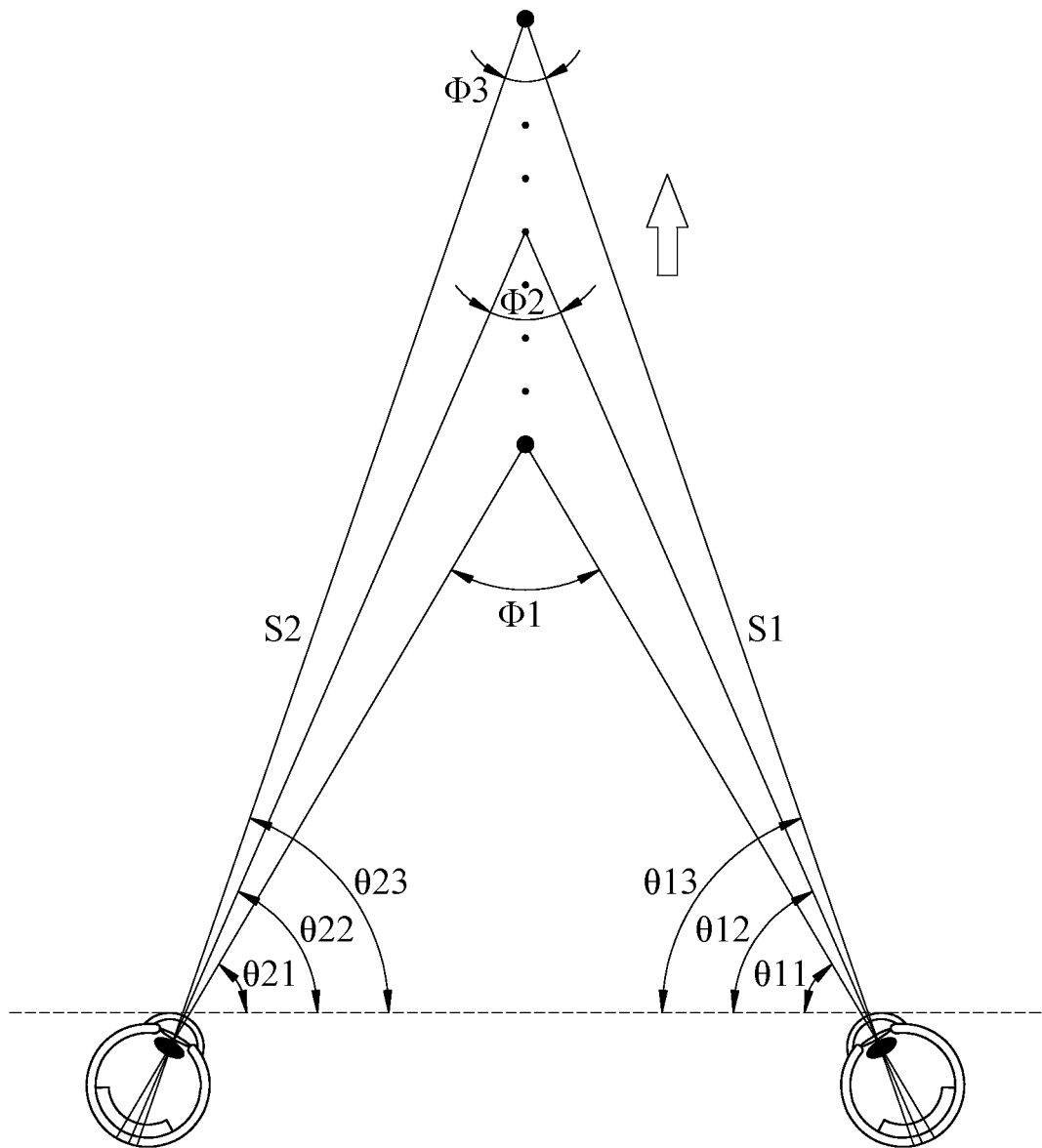
FIG. 8B is another schematic diagram showing a method of displaying a continuously variable depth of binocular virtual images in accordance with this disclosure.

The technical characteristics of the interaction between the user and the binocular virtual image of this disclosure will be described below. In FIGS. 8A and 8B, the first light direction adjuster 11 and the second light direction adjuster 21 of the head mounted display 90 of this disclosure change the direction of the first light signal and the second light signal emitted by the first emitter 10 and the second emitter 20 respectively, such that the first light signal and the second light signal are emitted to a first eye and a second eye relative to the first angle and the second angle θ2 of the user's frontal plane. For example, when the user drags the virtual object formed by the binocular virtual image, the first angle and the second angle θ2 are continuously changed to adjust the optical convergence angle of the light paths of the first light signal and the second light signal to modulate the depth of the binocular virtual image perceived by the user. This is due to the fact that when the location of the intersection of the light paths extension of the first light signal and the second light signal and the angle of convergence of the light constantly change and when the user's eyes fixate at the binocular virtual image constituted by the first light signal and the second light signal, the user changes the convergence angle of the eyes according to natural vision. In conjunction with the continuously changing intersection location of the light path extension of the first light signal and the second light signal in the physical space, the user can perceive the continuously changing location of the binocular virtual image in the physical space. The intersection location of the light path extension of the first light signal and the second light signal in the physical space is actually the rendering location of the binocular virtual image; therefore, the user can interact with the binocular virtual image by touching the location in the space with the user's hand. In some embodiments, when the intersection of the light path extension of the first light signal and the second light signal is in proximity to the part of coordinates of the user's hand, the computing system with the head mounted display 90 in accordance with this disclosure can activate the interaction between the virtual object and the real object, such as using the hand to drag and change the coordinates of the binocular virtual image, or touching the icon of the application program by the user's hand to activate the application program.

The major difference between this disclosure and the prior art is that users can accurately touch the seen virtual object and interact with the seen virtual object, as suppose in a situation that the user's perceived location of the virtual object being different from the actual coordinate of the virtual object. This is due to the fact that the light paths extension of the first light signal and the second light signal (forming the virtual object) form an intersection in the physical space, and the actual spatial coordinates of the intersection are registered in the computing system with the head-mounted display 90, and then the coordinates of a part of the user's hand in the physical space are known by the gesture tracking sensor 100 disposed on the head-mounted display 90, and the computing system with the head-mounted display 90 knows whether or not the user has touched the virtual object by comparing the coordinates of the part of the hand in the physical space with the coordinates of the part of the virtual object in the physical space. More importantly, when the user of the head-mounted display 90 intends to interact with the virtual object, the user must fixate at the virtual object and move his or her hand to the location of the virtual object to touch the virtual object. Therefore, when the user fixates at a part of the binocular virtual image formed by the first light signal and the second light signal and touches the part of the binocular virtual image at the fixated location by a part of the hand to initiate the interaction, the location of the part of the hand is substantially the same as the fixated location. At this time, the user can clearly perceive his/her hand and the virtual object without focal rivalry caused by the different depths of field perception between the virtual and real objects, and the user can perceive the location of the virtual object more accurately. Unlike the related-art augmented reality systems, the users of the computing system of this disclosure do not need to wear any locationing devices, such as gloves, or manipulate the user interface (e.g., operating a mouse cursor) and can interact with virtual objects directly without the need for other media.

While the disclosure has been described by means of specific embodiments, it is to be understood that the disclosure is not limited thereto. To the contrary, numerous modifications and variations could be made thereto by those skilled in the art without departing from the scope and spirit of the disclosure set forth in the claims.

What is claimed is:

1. A computing system with a head mounted display, comprising:
    a first input device, for receiving a first data inputted by a user, and the first input device comprising a processor for processing the first data and generating an output data in response to the first data; and
    a head mounted display configured to be worn by the user, communicatively coupled to the first input device through a communication module, for receiving the output data and displaying a binocular virtual image related to the output data;
    wherein, the head mounted display comprises a first emitter configured to emit and scan a first collimated laser light signal, a second emitter configured to emit and scan a second collimated laser light signal, a first light reflector and a second light reflector for changing directions of the first collimated laser light signal and the second collimated laser light signal to redirect the first collimated laser light signal and the second collimated laser light signal with a first angle and a second angle relative to the user's frontal plane towards a first eye and a second eye of the user respectively, wherein a light path extension of the redirected first collimated light signal and a light path extension of the redirected second collimated light signal intersect at a spatial location to define a virtual binocular pixel, and the first angle and the second angle are changeable continuously to adjust an optical convergence angle of light paths of the first collimated laser light signal and the second collimated laser light signal to modulate a depth of the virtual binocular pixel, to form a binocular virtual image having continuously variable depth perceivable by the user,
    a distance measuring sensor coupled to the processor and configured to measure spatial coordinates of a part of the user's hand,
    wherein the processor is configured to compare a current spatial location of the binocular virtual image, which is located at the intersection of the light path extension of the redirected first collimated light signal and the light path extension of the redirected second collimated light signal, with the spatial coordinates of the part of the user's hand measured by the distance measuring sensor, and based on the comparison, to change the binocular virtual image or activate an application program,
    whereby when the intersection of the light paths extension of the redirected first collimated laser light signal and the redirected second collimated laser light signal and coordinates of the part of the user's hand are in proximity to each other, the user's hand interacts with the binocular virtual image.

2. The computing system with a head mounted display according to claim 1, wherein the first input device further comprises a flat display module, for displaying a user interface to receive the first input data from the user.

3. The computing system with a head mounted display according to claim 1, further comprising a streaming module telecommunicatively coupled to the head mounted display for transmitting a streaming data to the head mounted display, and enabling the head mounted display to display the streaming data.

4. The computing system with a head mounted display according to claim 3, wherein the streaming module comprises a second input device for receiving a second input data from the user.

5. The computing system with a head mounted display according to claim 3, wherein the streaming module comprises a gesture tracking sensor for receiving a third input data from the user.

6. The computing system with a head mounted display according to claim 3, wherein the streaming module comprises a biometric sensor for sensing a biological parameter from the user.

7. The computing system with a head mounted display according to claim 6, wherein the biological parameter includes a heartbeat or a respiration rate.

8. The computing system with a head mounted display according to claim 1, wherein the head mounted display further comprises an audio output module for outputting an audio related to the output data.

9. The computing system with a head mounted display according to claim 1, wherein the head mounted display further comprises an audio receiving module for receiving a fourth input data from the user.

10. The computing system with a head mounted display according to claim 1, wherein the first input device is foldable.

11. The computing system with a head mounted display according to claim 1, wherein the first input device comprises a biometric sensor for sensing a biological parameter from the user.

12. The computing system with a head mounted display according to claim 1, wherein when the user fixates at the part of the binocular virtual image formed by the first collimated laser light signal and the second collimated laser light signal, the depth of the part of the binocular virtual image formed by the first light signal and the second light signal is substantially the same as the depth of fixation.

13. The computing system with a head mounted display according to claim 1, wherein when the user uses the part of the hand to interact with the binocular virtual image, the processor is configured to, in response to a changed in the measured spatial coordinates of the part of the user's hand, control the head mounted display to change a spatial location of the binocular virtual image, whereby a depth of the binocular virtual image continuously changes with a depth of the coordinates of the hand.

* * * * *